July 12, 1955
R. H. STEINMEYER ET AL
2,712,688
METHOD OF MAKING FLUID DIRECTING MEMBER
Filed June 25, 1948
4 Sheets-Sheet 1
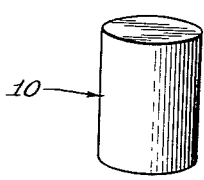
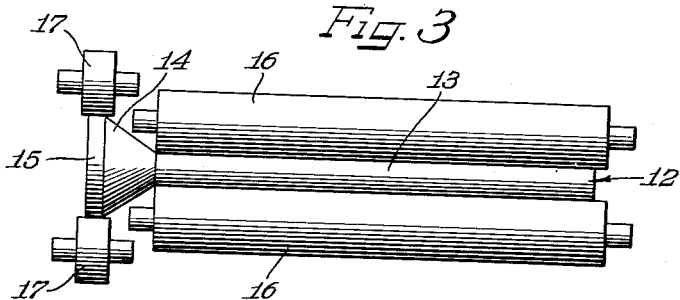
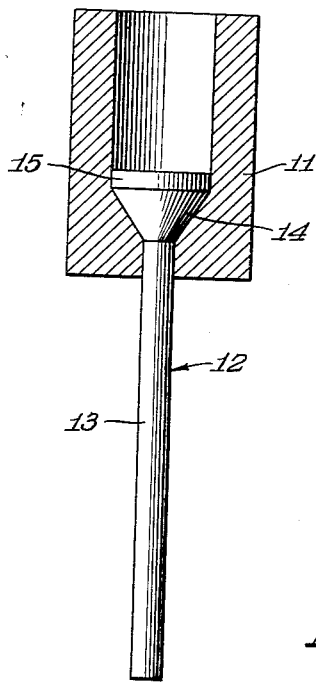
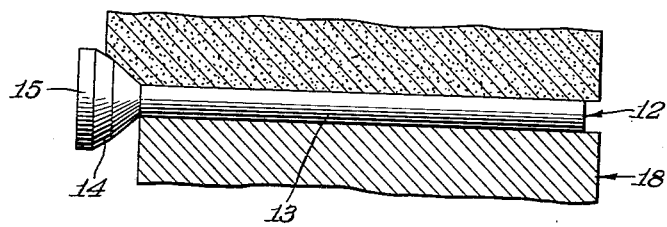
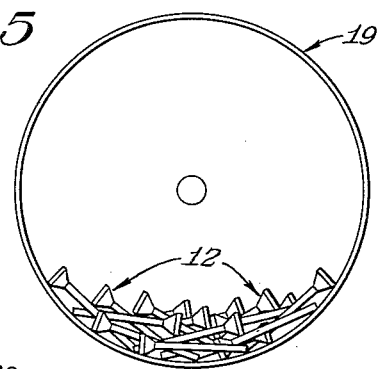
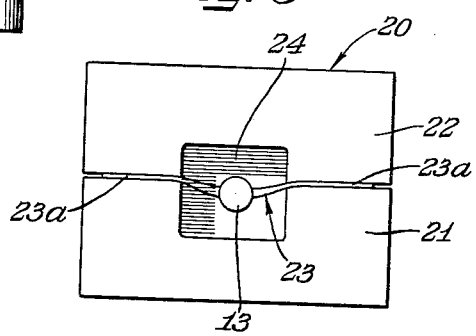
Inventors
Ralph H. Steinmeyer &
William M. Williams
by The Firm of Charles M. Little Attys July 12, 1955   R. H. STEINMEYER ET AL   2,712,688
METHOD OF MAKING FLUID DIRECTING MEMBER
Filed June 25, 1948   4 Sheets-Sheet 2
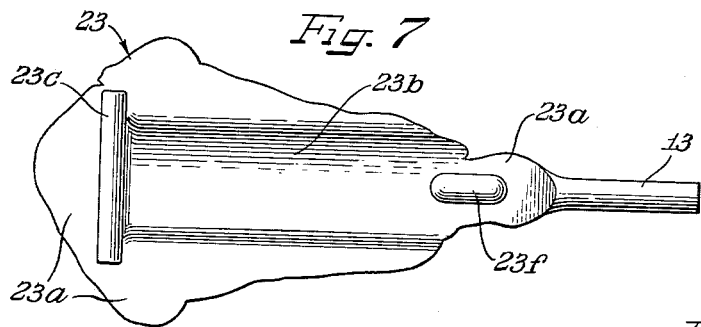
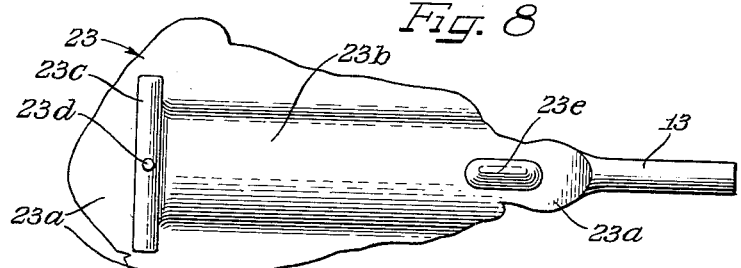
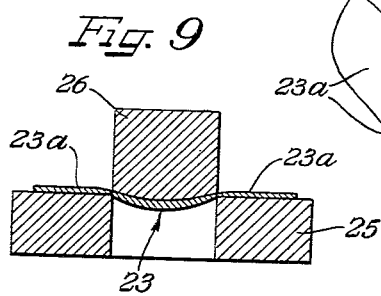
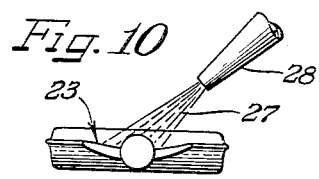
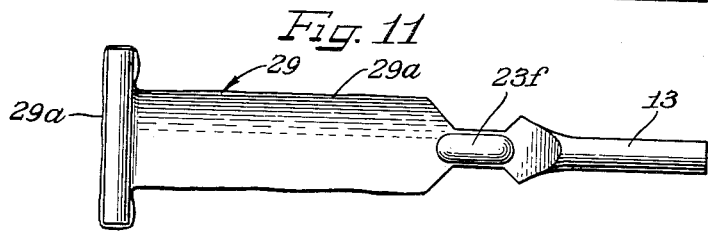
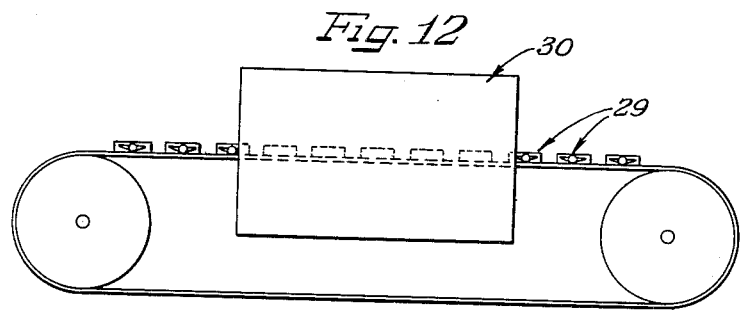
Inventors
Ralph H. Steinmeyer &
William M. Williams
by   Attys July 12, 1955  R. H. STEINMEYER ET AL  2,712,688
METHOD OF MAKING FLUID DIRECTING MEMBER
Filed June 25, 1948  4 Sheets-Sheet 3

Inventors
Ralph H. Steinmeyer &
William M. Williams
by Attys

July 12, 1955     R. H. STEINMEYER ET AL     2,712,688
METHOD OF MAKING FLUID DIRECTING MEMBER Filed June 25, 1948     4 Sheets-Sheet 4

Inventors
Ralph H. Steinmeyer &
William M. Williams
by The Firm of Charles Hollill Attys

United States Patent Office 2,712,688
Patented July 12, 1955

2,712,688

METHOD OF MAKING FLUID DIRECTING MEMBER

Ralph H. Steinmeyer, Willoughby, and William M. Williams, Mentor, Ohio, assignors to Thompson Products, Inc., Cleveland, Ohio, a corporation of Ohio Application June 25, 1948, Serial No. 35,236

3 Claims. (Cl. 29—156.8)

This invention relates to the production of fluid-directing members, such as blades, vanes, and buckets for turbo-jet propulsion engines, and particularly deals with the precision forging of such members to preserve the finish of the metal being worked and to consistently maintain precision tolerances not heretofore achieved in forging technique.

Fluid-directing members of the type produced by this invention have complicated foil sections of varying contour along their length, together with root portions of increased thickness for anchoring the members to the compressor wheel, turbine wheel, or diaphragm ring of a jet engine. The foil sections are designed to most efficiently direct air or gases at the particular places where the members are installed in a turbo-jet engine, and the efficiency of the engine depends largely upon the effectiveness of these foil sections. Since heat and corrosion must be effectively resisted by the fluid-directing members in a jet engine, these members are composed of heat and corrosion-resistant metals, such as alloy steels, which cannot be easily forged. Chromium steels containing from 11½ to 13% chromium, from .06 to .13% carbon, from .25 to .8% manganese, and not more than .5% each of silicon, nickel, molybdenum, and copper are quite effective. Since such metals can only be forged at elevated temperatures of around 1800 to 1900° F., considerable difficulty has heretofore been encountered in connection with scaling and pitting during the forging operation. As a result, it has heretofore been necessary to utilize sanding and polishing operations for removal of scale and pits, and, of course, since such operations must depend upon the skill of individual operators, it has heretofore been impossible to consistently maintain precision dimensions for the members.

The present invention minimizes heretofore-encountered scaling and pitting and avoids the heretofore necessary hand-polishing and sanding operations to produce smooth foil sections. According to this invention, fluid-directing members with consistently accurate foil sections and root portions are produced by successive forging operations followed by a cold coining operation in highly polished precision dies under extremely high pressures. The metal is protected during these operations by lubricants such as graphite and soap, and the original finish of the metal is preserved and improved so that scale and pits do not have to be removed by hand-polishing and buffing. As a result, it is now possible to achieve a new order of precision dimensions by forging even the most complicated shapes.

An important feature of the invention resides in the utilization of a cold coining operation in highly polished dies operated at very high pressures to work any deviations from tolerance limits out of the member while improving the finish of the metal.

It is, then, an object of the invention to provide precision forged fluid-directing members.

Another object of the invention is to provide a forging process which successively produces uniform complicated metal shapes within very close tolerance limits, and which does not require heretofore-necessary polishing and buffing operations.

Another object of the invention is to provide a method of precision forging which consistently reproduces accurate and finished dimensions on relatively hard metals.

A still further object of the invention is to produce vanes and blades for jet propulsion engines from cylindrical rod material through the media of a series of operations which actually improve the finish of the metal and render unnecessary heretofore considered essential hand-polishing operations.

A further specific object of the invention is to provide metal vanes and blades for jet engines which are accurately sized through metal flow in an extremely high pressure die press containing highly polished dies which never fully close, so that excessive metal can be worked beyond the margin of the vane or blade.

Another object of the invention is to provide a series of hot and cold forging operations on relatively hard high chromium content steel alloys only when such alloys are protected against scaling through the media of lubricants covering the forging dies.

Other and further objects of the invention will be apparent to those skilled in the art from the following detailed descriptions of the annexed sheets of the drawings which, by way of a preferred example only, illustrate one embodiment of the invention for making compressor blades for jet propulsion engines.

On the drawings:

Figure 1 is a perspective view illustrating a slug of chrome steel from which the blade of this invention is prepared.

Figure 2 is an elevational view, with a part in vertical cross section, illustrating the manner in which the slug of Figure 1 is extruded to form a headed rod.

Figure 3 is a somewhat diagrammatic elevational view illustrating a roll-straightening operation on the headed rod of Figure 2.

Figure 4 is a fragmentary somewhat diagrammatic view illustrating a grinding operation on the straightened headed rod of Figure 3.

Figure 5 is a diagrammatic view illustrating a cleaning or tumbling operation on the headed rod produced according to Figure 4.

Figure 6 is a somewhat diagrammatic view illustrating a hot forging die for rough-forging a blade blank from the tumbled headed rods of Figure 5.

Figure 7 is a top plan view of a blade blank formed in the die of Figure 6.

Figure 8 is a bottom plan view of the blade blank formed in the die of Figure 6.

Figure 9 is a diagrammatic view illustrating the trimming of flash metal from the blade blank of Figures 7 and 8.

Figure 10 is a diagrammatic view illustrating the nozzle-blasting or cleaning of the trimmed blade blank of Figure 9.

Figure 11 is a top plan view of a blade blank formed from the cleaned blank of Figure 10 by a warm coining operation to shape the cleaned blank to substantially the desired dimensions.

Figure 12 is a diagrammatic view illustrating annealing of the warm coined blanks after they have been trimmed.

As shown on the drawings:

Figure 13:
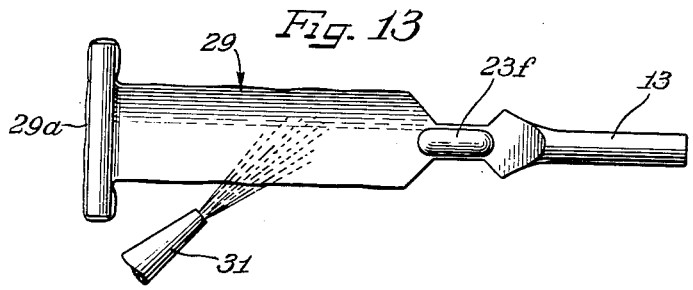
Figure 13 is a top plan view illustrating a cleaning operation of the annealed blanks.

In Figure 1 the reference numeral 10 designates a solid cylindrical slug of metal suitable for forming blades for jet engines. This metal must be resistant to heat and corrosion and is preferably a chromium steel containing from 11½ to 13% chromium, from .06 to .13% carbon, and from .25 to .80% manganese, together with other minor additions of nickel, silicon, molybdenum, copper, and the like as indicated hereinabove. The steel must be relatively pure and is made in an electric furnace.

As shown in Figure 2, a slug 10 is partially extruded in a die 11 to form a headed rod 12 having an elongated stem 13, a frusto-conical tapered neck 14, and an unreduced cylindrical head 15. As will be hereinafter explained, the stem 13 forms the air foil section of the blade, the frusto-conical portion 14 forms the fillet section between the air foil section and root, while the head 15 coacts with the conical portion 14 to provide metal for the root.

Since the extruding operation may misalign the stem with the conical portion and head, the headed blank 12 is subjected to a roll-straightening operation as shown in Figure 3, wherein sets of rollers 16 rotate around the stem portion 13 while additional sets of rollers 17 in concentric relation to the rollers 16 rotate around the head portion 15. This roll-straightening operation insures the axial alignment between the head and stem and also straightens out any curvatures in the stem.

The straightened blank 12 from the roll-straightening operation of Figure 3 is then subjected to a grinding operation on a centerless grinder 18 as shown in Figure 4 wherein the stem 13 and the portion of the frusto-conical neck 14 adjacent the stem are ground to exact dimensions. The end portion 15 of the head need not be ground. It should be appreciated that the resulting blank is free from pits, scale, or other defects, and has the exact desired dimensions along the stem and neck portions thereof. These dimensions are positively controlled by automatic machinery such as a centerless grinder so that individual skill of the worker does not determine the accuracy of the blank.

In order to improve the finish of the ground blanks 12, they are tumbled in a drum 19 shown in Figure 5 and are washed to place them in a form which will not cause any defects during the forging operation.

The tumbled and washed blanks 12 are then heated to hot forging temperatures of about 1800 to 1900° F. for a rough forging or block down operation shown in Figure 6.

As shown in Figure 6, a rough forging die press 20 composed of a bottom die section 21 and a top die punch 22 receives in succession the cleaned blanks 12 from the operation illustrated in Figure 5 to form rough blade blanks 23 illustrated in Figures 7 and 8. The die and punch sections 21 and 22 do not fully close so that excess flash metal 23a is flowed laterally outward from the shaping sections of the die punch to insure a complete filling of metal in the shaping sections. The die press 20 has an entrance hole 24 into which can be inserted the nose end of a pair of gripping tongs (not shown) for holding the stem 13 of the blank 12 in the die.

The dies 21 and 22 rough shape an air foil section 23b and a root section 23c from the blank 12 and at the same time form locating buttons 23d and 23e on the bottom of the air foil and root sections. A raised button 23f is also formed on the top of the air foil section 23b to complement the button 23e thereby providing a thickened portion on the end of the air foil section. Flash metal 23a extends beyond the air foil section as shown and a portion of the stem 13 remains undeformed to provide a grip for holding tongs and the like.

In order to maintain the clean smooth finish of the blanks 12 along the air foil portions and root portions of the forged blank 23, either the dies 21 and 22 or the blanks 12 are coated with non-oxidizing lubricant material such as colloidal graphite or the like. The graphite may be applied in the form of a paint in a water suspension. The graphite coating on the portions 23b and 23c of the blank 23 preserves the original smooth surface of the blanks 12 around the ground stem and neck areas thereof and prevents scaling and pitting. The preservation of an accurate finish is essential to maintain the precision dimensions achieved by this invention.

The blank 23 of Figures 7 and 8 is next subjected to a trimming operation in a trimming die 25 as shown in Figure 9. A punch 26 coacts with the die 25 to trim off the flash metal 23a around the air foil and root sections of the blade blank 23. The flash metal 23a adjacent the undeformed stem 13 is not removed. It will be appreciated that this stem portion 13 is utilized as a tong grip during the trimming operation and during subsequent operations hereinafter described, so that the blanks are conveniently held in position. The trimming operation is preferably carried out while the blanks are in a somewhat heated condition. Since the forging operation to produce the blank 23 is carried out at forging temperatures of about 1800 to 1900° F., the blanks, during the trimming operation, may still be in a heated condition from the forging operation, or alternately, of course, may be reheated.

After the trimming operation, the resulting blanks 23 are, as shown in Figure 10, prepared for a second hot forging or warm coining operation by cleaning with a blast 27 of abrasive material or the like from nozzles such as 28, as shown in Figure 10. This cleaning operation results in a removal of the graphite coating on the foil and root portions of the blade and preserves the accurate finish of the blade. Removal of the graphite coating is desirable so that a thick coating is not built up during the succeeding operations, which coating would interfere with the maintenance of the desired narrow tolerance limits.

The cleaned blasted trimmed blanks 23 are next heated to about 1400 to 1450° F. for the warm coining or second forging operation in a forging press which has the dies thereof shaped to bring the rough blank down to finished dimensions and produce a blank such as shown at 29 in Figure 11. This blank has flash metal 29a moved laterally from the air foil section and also contains some flash metal 29a at the root portion. The blank during the forging operation or warm coining operation is coated with colloidal graphite material to protect its finish. The tongue grip end of the stem 13 is, of course, utilized to hold the blank during the forging or warm coining steps. The dies for effecting the warm coining operation are similar to those illustrated in Figure 6, but are so shaped as to give a more accurate dimension to the product being acted on. The dies do not close, so that excess metal can be flashed laterally away from the surfaces being worked. After the treatment in the warm coining or forging dies, the blank 29 has the flash metal trimmed therefrom and is subjected to an annealing operation in an annealing furnace 30 illustrated in Figure 12. During this annealing step, the blanks are heated to temperatures of about 950 to 1250° F. for about 1 to 2 hours followed by an air quenching operation. The annealed blanks 29 are next subjected to a further cleaning operation to remove the colloidal graphite coat from the surfaces thereof. This cleaning operation may consist of a wet nozzle blast of abrasive materials from nozzles such as 31 as shown in Figure 13, a tumbling operation as shown in Figure 5, and a degreasing operation. These cleaning operations prepare the blank for the subsequent cold coining operation which imparts the final precision dimensions to the foil section. It is important that the finish of the blade be preserved, as the presence of dirt, coating material, or the like would interfere with the maintenance of precision dimensions.

Figure 14:
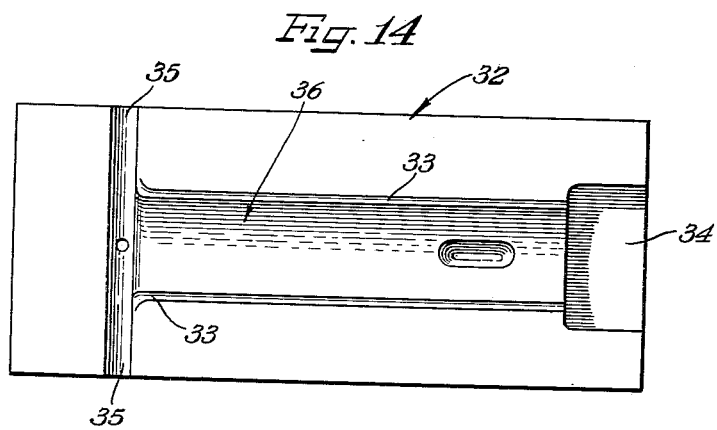
Figure 14 is a plan view of a highly polished coining die for finishing the blank of Figure 13 into final shape.

The cleaned blank 29 is subjected to a cold coining operation at very high pressures in dies 32 such as shown in Figure 14. These dies are hydraulically operated and act with tremendous pressures on the blank. Pressures of from 500 to 1000 tons are used to coin compressor blades for jet engines according to this invention. These pressures average about 150 to 300 tons per square inch. The press is set to reach a predetermined maximum pressure and, as in the case of the forging and warm coining dies, the dies do not fully close, so that the excess metal is flashed laterally of the blank being coined. As shown in Figure 14, flash gutters 33 are formed alongside of the foil forming portion and fillet forming portion of the die, while the foil end portion of the die opens into a tongs hole 34 and the ends of the root-forming portions of the die are open as at 35.

During the cold coining operation the metal finish on the blank is preserved and the blank is lubricated by a coating of a suitable soap solution. The cold coining operation can be carried out on one or two strokes of the hydraulic press. Thus in some instances it may be desirable to close the press twice on each blank in order to form the desired shape into the blank. Since the foil-forming section 36 of the die 32 has a very complicated contour varying along its length to produce the desired twist in the foil section of the blade, extreme care must be taken not to deform the dies, so that the precision dimensions can be maintained. The cold coining operation is carried out on a chrome steel which, even though it is annealed, is still very tough and hard. The dies are highly polished and are shaped into exact dimensions by very fine diamond polishing operations. They assist in imparting a very smooth finish to the blank.

Figure 15:
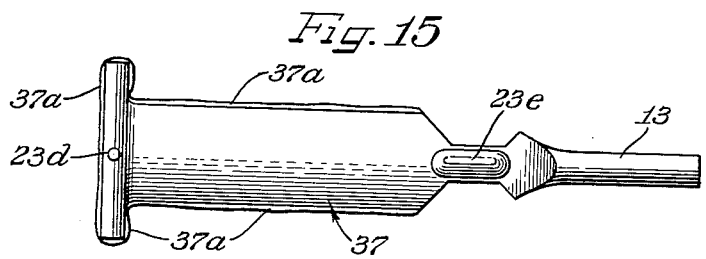
Figure 15 is a bottom plan view of a blank after being coined in the die of Figure 14.

As shown in Figure 15, the cold coined blank 37 may have flash metal 37a formed along the sides of the foil section thereof and extending into the fillet portion of the root. Flash metal can also be formed at the ends and along the edge of the root. It will be appreciated, of course, that the cold coining dies have the bead pockets for receiving the buttons 23d and 23e of the original blocked down blank, so that the blank 37 will be held in position in the dies even though the dies do not fully close around the blank. The enlarged end 23e remains on the blank 37 together with the tongs grip portion of the original stem 13.

Figure 16:
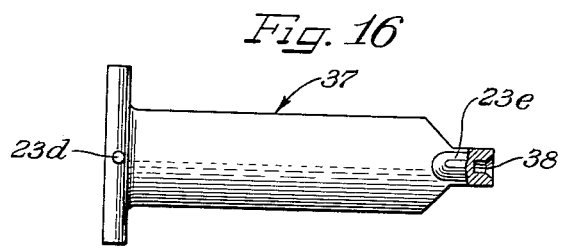
Figure 16 is a bottom plan view of the blade blank after the flash metal of the blank of Figure 15 has been removed, the end rod portion has been ground off, and a hole has been drilled in the extension on the blade end.
Figure 17:
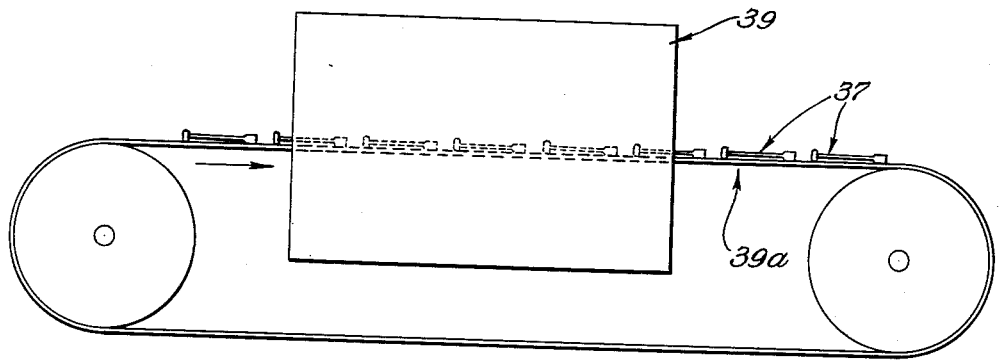
Figure 17 is a diagrammatic view of a heat hardening and drawing operation for the blanks of Figure 16.

The cold coined blank 37 is next subjected to cutting and grinding operations to remove the tongs grip 13, to drill an axial hole 38 in the enlarged portion 23e as shown in Figure 16, and to remove the flash metal 37a. The hole 38 in the enlarged portion 23f cooperates with the button 23d to center the blank 37 in suitable grinding machines and the like. After these operations have been performed, the blank is then again washed and subjected to a hardening and air drying treatment illustrated in Figure 17 wherein a heating furnace 39 heats the blanks 37 to temperatures of about 1650 to 1800° F. for about 15 minutes and allows the heat treated members to air cool at 39a. The air cooled members are then subjected to a drawing operation at temperatures around 950 to 1250° F. for about 1 to 2 hours followed by an air cooling step.

Figure 18:
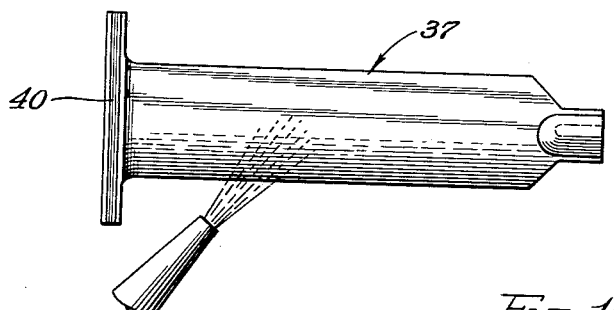
Figure 18 is a bottom plan view illustrating the blank after the root end has been machined, and also showing the manner in which the blank is subjected to a cleaning up operation under a wet blast.
Figure 19:
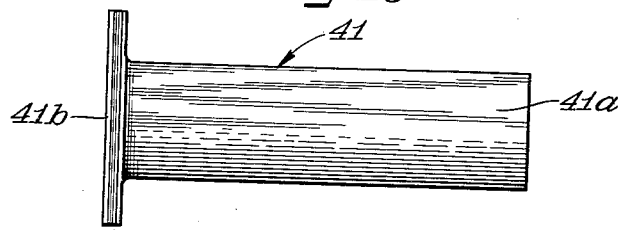
Figure 19 is a bottom plan view of the finished blade.
Figure 20:
Figure 20 is a side elevational view of the finished blade of Figure 19.

The hardened and drawn blanks 37 are next ground to remove the button 23d from the root. The blanks are preferably also subjected to another wet blasting treatment to tone up the finish, and a dovetail groove 40 is broached into the root as shown in Figure 18. This dovetail groove coacts with suitable locking means on the rotor or stator support for the blade in the jet engine. The air foil section of the blank 37 is next trimmed to the desired length and a final blade 41 shown in Figures 19 and 20 results. This blade has a foil section 41a with a varying cross section along its length and a twisted contour. The blade also has a root portion 41b which is accurately machined to the desired dimensions for fitting in a retainer in the jet engine.

From the above description it will be understood that the invention makes possible precision forging of very complicated shapes and includes the maintenance of an exact finish on the material being forged so that an original control of this finish is preserved throughout the forging operations and is actually improved in the cold coining operation of the process. This cold coining operation is carried out under tremendous pressures and not only removes from the article being treated any deviations from exact dimensions, but also cold works the metal to improve its metallurgical properties.

It will, of course, be understood that various details of the product and method may be varied through a wide range without departing from the principles of this invention and it is, therefore, not the purpose to limit the patent granted hereon otherwise than necessitated by the scope of the appended claims.

We claim as our invention:

1. The method of accurately producing fluid-directing members each having a fluid-directing foil section of varying contour along its length and a root portion for anchoring the member on a support which comprises forming a headed metal rod with a stem portion of controlled diameter size and a tapered head portion of controlled tapered size, hot pressing said headed metal rod into a blank having a flattened blade portion intermediate its ends together with a transversely extending root rib at one end and an undeformed rod portion at the other end, protecting the surfaces of the headed rod with graphite during said hot forging operation to prevent scale formation on the forged areas, flashing excess metal beyond the shaped rib and blade areas during said forging operation, trimming off the excess flashed metal, cleaning the trimmed blank, warm forging the trimmed blank to form the rib and root portions closer to the desired dimensions while protecting the surfaces thereof with graphite and flashing excess metal beyond the rib and root portions, removing the thus formed flash metal, annealing the resulting blank, cleaning the annealed blank, and cold coining the annealed clean blank between highly polished dies at pressures of from 150 to 300 tons per square inch to form the blank to exact dimensions while flashing any excess metal laterally of the blank and protecting the finish of the blank with a lubricant, trimming off the rod end of the blank, heat-treating the blank to harden the same, cleaning the heat-treated blank, machining the rib portion of the blank to form locking edges thereon, and trimming the foil section of the blank to the desired length.

2. The method of consistently producing fluid-directing members of extremely accurate dimensions which comprises forming a headed rod having an accurately finished stem and head portion, heating the rod to temperatures of about 1800 to 1900° F., gripping the end of the stem portion of the headed rod with a pair of tongs, blocking down a portion of the stem and the head in forging dies, protecting the stem and head portions being forged with graphite, trimming the blocked-down blank to remove excess flash metal, cleaning the trimmed blank, heating the blank to temperatures between 1400 to 1450° F., forging the trimmed blank at said temperatures to bring the dimensions of the root and foil sections thereof closer to the desired dimensions while flashing off excess metal, protecting the metal during the forging operation with graphite, cleaning the doubly forged blank, annealing the thus cleaned blank, cold coining the annealed blank at pressures of about 150 to 300 tons per square inch in polished dies for forming the foil section of the blank into finished shape and dimensions, and trimming off any flash metal after the cold coining operation.

3. The method of making precision forged blades for jet engines and the like which comprises forming a headed rod of suitable blade metal, removing all surface irregularities from said headed rod, providing a smooth finish on the headed rod, heating the rod to hot forging temperatures, hot forging the head and stem portions of the rod to form an air foil section and a root section and to form locating buttons on the root and foil sections, covering the metal with a protective material to protect the metal against scaling and pitting during said hot forging operation, cleaning the protective material off of the resulting blank, heating the blank to forging temperatures lower than the first used forging temperatures, further forging the blank in dies having receptacles for receiving the locating buttons of the blank to produce a blank having dimensions closer to the desired dimensions than the first formed blank, protecting the finish of the metal during the second forging operation, cleaning the thus forged blank, cold coining the blank at high pressures to form the air foil section into the exact desired shape and within very close tolerance limits, and heat treating the cold coined blank to develop desired physical properties in the metal.

References Cited in the file of this patent

UNITED STATES PATENTS

| | | |
|---|---|---|
| 1,316,817 | Strauss | Sept. 23, 1919 |
| 1,409,658 | Brann | Mar. 14, 1922 |
| 1,474,516 | Eicher | Nov. 20, 1923 |
| 1,607,968 | Spire | Nov. 23, 1926 |
| 1,771,023 | Allen | July 22, 1930 |
| 1,987,234 | Hill | June 8, 1935 |
| 2,013,622 | Bedford et al. | Sept. 3, 1935 |
| 2,081,645 | Squires | May 25, 1937 |
| 2,166,998 | Morgan | July 25, 1939 |
| 2,197,076 | Groene et al. | Apr. 16, 1940 |
| 2,291,828 | New | Aug. 4, 1942 |
| 2,308,426 | Rettaliate | Jan. 12, 1943 |
| 2,373,827 | Halford et al. | Apr. 17, 1945 |
| 2,503,630 | Norton | Apr. 11, 1950 |
| 2,577,747 | Gibian | Dec. 11, 1951 |

FOREIGN PATENTS

| | | |
|---|---|---|
| 398,898 | Great Britain | Oct. 18, 1932 |

OTHER REFERENCES

Article "Poppet Valves Made in One Piece," pp. 1753–1754, from magazine "The Iron Age," June 21, 1928.

Metals Handbook, 1939 ed., pp. 886–887, pub. by The American Society for Metals, Cleveland, Ohio.

"German Piston Manufacture," pp. 74, 59, 58, October 18, 1946.

German Practice in Fabrication of Gas Turbine Blades, by Joseph Robinson, June 13, 1947. Published by Technical Industrial Intelligence Division, U. S. Department of Commerce.

"Drawing and Forging Turbine Blades," pp. 545–548, in Steel Processing, published June 13, 1947.